Aug. 16, 1966 R. H. HARWOOD 3,267,437

APPARATUS FOR OPERATING AN INPUT-DEVICE RECORDING TAPE
ASYNCHRONOUSLY WITH A SYNCHRONOUS DIGITAL
COMPUTER SYSTEM

Filed Aug. 29, 1962

INVENTOR.
ROBERT H. HARWOOD
BY [signature] AGENT
[signature]
ATTORNEYS

United States Patent Office 3,267,437
Patented August 16, 1966

3,267,437
APPARATUS FOR OPERATING AN INPUT-DEVICE RECORDING TAPE ASYNCHRONOUSLY WITH A SYNCHRONOUS DIGITAL COMPUTER SYSTEM

Robert H. Harwood, San Diego, Calif., assignor to the United States of America as represented by the Secretary of the Navy Filed Aug. 29, 1962, Ser. No. 220,950
5 Claims. (Cl. 340—172.5)

Figures 1, 2:
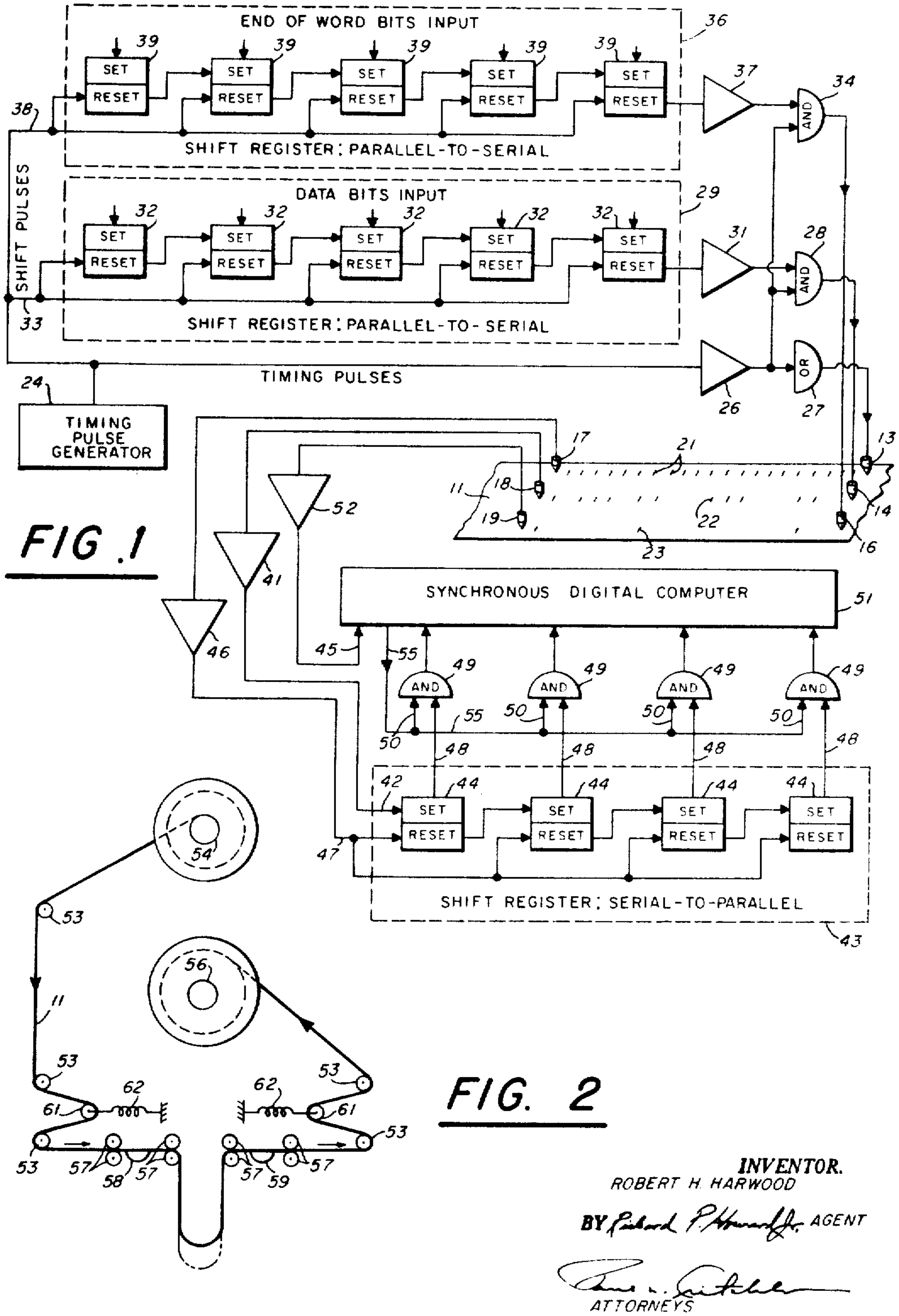

The invention described herein may be manufactured and used by or for the Government of the United States of America for governmental purposes without the payment of any royalties thereon or therefor.

The present invention relates to a method and apparatus for feeding external data to a digital computer and more specifically to such method and apparatus wherein the intelligence-bearing tape of the input device, which immediately conveys this external data to the computer, is operated asynchronously with respect to the synchronously-run digital computer with which it is associated.

It has been past practice to operate the magnetic tape of the data input device in synchronism with its associated computer. This involves either synchronizing the input device magnetic tape to the computer, whose units are generaly timed to a master clock, or synchronizing the computer to the input device magnetic tape rate of transport. The latter is accomplished by recording clock pulses on the magnetic tape and employing the clock pulses to time the operation of the computer units. Either of the aforedescribed approaches for accomplishing cosynchronism of the input device magnetic tape with the computer demands an exercise of very exact control of the tape speed and maintenance of a very low percentage of "flutter" and "wow" with respect to the recorded data on the tape. (Flutter may be defined as the "deviations in reproduced 'sounds' from their original frequencies which result, in general, from irregular motion during recording, duplication, or reproduction"; wow, in turn, is definable in the same terms, but is commonly applied to flutter involving relatively low frequencies.) Such precise control of the tape speed requires very expensive, difficult-to-maintain tape transport equipment.

In brief, the present invention employs a method for conveying external intelligence data to a computer via a data input device without the need for synchronizing the rate of travel of the recording tape of the data input device with the associated computer or vice-versa. In essence, this is accomplished by furnishing, on a separate track on the input device recording tape (which is usually a magnetic tape) a timing pulse which is coincident with each information bit recorded on said tape from a given external source and then, when reading out from said tape to the computer, employing said timing pulses as shift pulses to feed the read-out information bits into a buffer store from which the information bits can be fed to the computer system at any desirable rate. This method avoids those difficulties (some of which have been noted above) encountered in the systems wherein the computer and input device recording tape are operated in synchronism. The method disclosed herein allows the tape speed to vary over rather wide limits without affecting proper operation, Moreover, this method, predicated on the use of the coincident timing pulses as shift pulses for transferring the recorded data bits, can accommodate satisfactorily to "yaw" or to change of speed of the input-device tape or to slippage in tape transport or to any like circumstances; the timing pulses for controlling the transfer of the data bits to the computer don't have to be recorded on or read out from the tape at equal intervals and, accordingly, aberrations in timing pulse spacing impose no difficulty to the data transfer to the computer. In contradistinction, where the computer master clock is used to control read-out from the input device tape to the computer, i.e., where the input device tape is operated in synchronism with the associated synchronously-operated computer, the aberrations noted create "dropouts" of data bits, lost data and even cause false data to be fed to the computer. Still another advantage in the present method is that it allows for the use of two separate tape transports to enable the input-device to be used as an arbitrary-length delay.

An object of the present invention is to provide a method for conveying input data to a digital computer wherein exacting control of the speed of the recording tape of the input device is not a requisite to satisfactory operation.

Another object is to provide a method for conveying input data to a digital computer wherein the recording tape of the data input device can be operated asynchronously with respect to the synchronously-operated associated digital computer system.

A further object is to provide a method for conveying input data to a digital computer wherein the tape speed of the recording tape of the input device to the computer can vary over wide limits without impairing the input data transfer to the computer.

Still another object is to provide, for a digital computer system, a data input device which includes inexpensive, easily-maintainable tape transport equipment.

Other objects and many of the attendant advantages of this invention will be readily appreciated as the same becomes either understood by reference to the following detailed description when considered in conjunction with the accompanying drawing in which:

FIG. 1 is a schematic showing of an embodiment of the apparatus employed in the invention with the recording tape shown in partial form; and FIG. 2 portrays a conventional recording tape transport suitable for use in the invention.

The description which follows will relate to a conventional digital computer system which is predicated on the use of bistable, two-state elements which operate with binary-coded signals which hereinafter will be referred to as "1's" or "0's" as the case may be, the former referring to the presence of a significant signal pulse and the latter to the absence of such a significant signal pulse.

Referring to FIG. 1, magnetic tape 11 is the intelligence-bearing tape of a computer data input device 12, which includes conventional tape transport equipment (shown in FIG. 2). In registry with this tape 11 is a series of respective record heads 13, 14, and 16 and a series of respective readout heads 17, 18, and 19. In the method of this invention record head 13 functions to record a series of spaced timing pulses 21 on tape 11. The remaining record heads 14 and 16 respectively record such conventional data as "data bits" 22, "end of word bits" 23, or any other appropriate scheme of informational bits.

Readout head 17 reads out the aforementioned timing pulses 21 and the readout heads 18, and 19, in the order named, respectively read out the data bits 22 and end of word bits 23 from this tape 11.

Connected to record head 13 is a timing pulse generator 24 whose output is connected to the record head 13 via the serial sequential combination of a pulse signal amplifier 26 and a conventional OR gate 27.

Record head 14 is immediately connected to the output of a conventional AND gate 28, having two inputs. One of the input paths to AND gate 28 is from the output of timing pulse generator 24, via pulse amplifier 26, and the other input to AND gate 28 comes from the output of a shift register 29 via pulse amplifier 31. Shift register 29 may be any conventional parallel-to-serial converter and is shown here as a shift register whose individual units comprise conventional "flip-flops" 32. Flip flops are well known in the digital computer art and may be comprised of tubes, diodes or transistors. Portraitive of such conventional flip-flops are two tubes with cross-connected grids and anodes. Such a flip-flop is a bistable device, that is, it has two stable conditions, one with one tube conducting and the other tube cut off and the alternative condition with conduction-nonconduction states of the respective tubes reversed. It is customary to designate one condition as the "set" condition and the other condition as the "reset" condition. It will be further noted that timing pulse generator 24 also provides the shift signal via lead 33 to the shift register 29.

In like fashion record head 16 is connected to the output of AND gate 34 whose respective inputs are connected, on the one hand, to the output of timing pulse generator 24 via pulse amplifier 26 and, on the other hand, to the output of parallel-to-serial conversion shift register 36 via pulse amplifier 37. Here also the shifting pulses of the shift register 36 are derived from the output of timing pulse generator 24 via lead 38 and this shift register 36 is composed of conventional flip-flops 39.

Data bit pulse readout head 18 is connected via a pulse amplifier 41 to the data input lead 42 of a serial-to-parallel conversion shift register 43 which is composed of conventional flip-flops 44.

Timing pulse readout head 17 is connected, via a pulse amplifier 46, to the shift signal input lead 47 of this same shift register 43.

End-of-word bit readout head 19 is connected via a pulse amplifier 52 and computer input lead 45 to digital computer 51.

The data output leads 48 of shift register 43 are connected individually to the respective inputs of a parallel grouping of AND gates 49 whose respective outputs lead to a synchronous digital computer 51. Each of these respective AND gates 49 has a further input 50 which is connected to a signal output lead 55 from synchronously-operated digital computer 51.

FIG. 2 portrays a conventional tape transport mechanism for transporting tape 11 of input device 12. This tape transport mechanism as shown comprises a plurality of guiding rollers 53 for guiding the tape 11 throughout the greater portion of its travel from reel 54 to reel 56. The drive mechanism for imparting linear travel to the tape 11 comprises a plurality of drive rollers 57 which are disposed in paired cooperating oppositely-rotating drive rollers both before and after record head group 58 and before and after readout head group 59 and are adapted to connect to conventional motor means (not shown). Record head group 58 corresponds to the parallel-grouped record reads 13, 14 and 16 of FIG. 1 and readout head group 59 corresponds to the parallel-grouped readout heads 17, 18 and 19 of the same figure of the drawing. Between the two inboard sets of drive rollers 57 tape 11 takes the form of a storage loop whose length may be varied as desired. Also present in the tape transport mechanism are a pair of individual slightly-spring-biased tensioning rollers 61 which are connected to springs 62 for putting a slight tension on the tape at each of the respective positions of these rollers 61 for the purpose of keeping the tape relatively taut.

*Method of invention and operation of apparatus therewith*

The basic data bits, binary-coded to assume the form of either the presence or absence of a significant data pulse, the former classifiable as a 1 signal pulse and the latter as a 0 signal pulse, are fed in parallel fashion to the flip-flops 32 of shift register 29. With timing pulse generator 24 having its output connected to the shift signal input of the shift register 29, the data bits in shift register 29 are transmitted serially from shift register 29 in response to the recurring timing pulses issuing from the timing pulse generator 24 to pass, via pulse amplifier

31 for signal amplification, to one of the two inputs of AND gate 28. The recurring pulses from timing pulse generator 24, in addition to providing the shift pulse for shift register 29, are also fed, via pulse amplifier 26 for pulse amplification and via OR gate 27 directly to record head 13 which records these timing pulses 21 on a separate track on magnetic tape 11. With timing pulses from the timing pulse generator 24 and the output from shift register 29 going to the respective inputs of AND gate 28 whose output is fed to record head 14, the data bits serially issuing from shift register 29 will be recorded on magnetic tape 11 coincidentally with the recording on magnetic tape 11 of timing pulses 21 by record head 13. Thus each data bit recorded on tape 11 will be coincident with a timing pulse thereon.

Timing pulse generator 24 also provides the shift pulses for shift register 36 which has a parallel input of end of word bits and a serial output of such end of word bits to AND gate 34, via an amplifier 37 for pulse signal amplification. With one input to AND gate 34 coming from the output of a shift register 36 and the other input to this AND gate 34 being the output signal from timing pulse generator 24, the end of word bits 23 are recorded on a separate track on tape 11 by record head 16 and also appear thereon coincidentally with recorded timing pulses.

The data bits 14 on tape 11 are the read out from the tape by readout head 18 and fed, via a pulse amplifier 41 for pulse amplification, to the data input lead of a serial-to-parallel-conversion shift register 43. At the same time, the separate track on tape 11 of recorded timing pulses 21 is read out by readout head 17 to provide the shift pulses for feeding the entire "word" of data bits into the shift register 43. When the shift register 43 has been "filled" with the data bits forming an operative "word," readout head 19, in response to the appearance of an end-of-word bit 23 on tape 11, generates a signal via amplifier 52 and lead 45 to the computer 51 indicating that the given word is ready in the shift register 43. The computer 51 then transfers a signal, at computer clock time, via its output lead 55 to the respective AND gates 49 (by way of AND gate input leads 50) to actuate the AND gates 49 causing transfer in parallel of the word in the shift register 43 to the computer 51 (i.e., the word is introduced into the computer in synchronism therewith) and clearing of the shift register 43.

Thus by furnishing on tape 11 of the data input device 12 a timing pulse which is coincident with each data/information bit on said tape and later, during readout from said tape, using these timing pulses as the source of shift pulses for transferring the read-out data/information bits to a shift register whose output is fed into a synchronous digital computer when individual words have been processed into the shift register, a method has been devised for transferring external data to a synchronously-run computer without the need to synchronize the magnetic tape of the data input device with the computer operation.

Obviously many modifications and variations of the present invention are possible in the light of the above teaching. It is intended to cover all changes and modifications of the embodiment set forth herein which do not constitute departures from the spirit and scope of the invention.

What is claimed is:

1. A system for transferring asynchronous digital data to a synchronous data equipment comprising;

- a first shift register having parallel inputs for receiving groups of said asynchronous digital data;
- a source of timing pulses, said pulses being connected to actuate said first shift register to produce serial output data commensurate with said groups of asynchronous digital data;
- a recording means adapted to receive and separately record said serial output data and said timing pulses;
- means for reproducing serial data and timing signals in response to said recorded serial output data and timing pulses; and a second shift register connected to receive said reproduced serial data signals and adapted to respond to said timing pulse signals for arranging said signal data in parallel groups, said second shift register being responsive to the coincidence of said parallel group of digital data signals with synchronous signals derived from said synchronous data equipment for causing said groups of digital data signals to be synchronously transferred into said equipment.

2. A system as claimed in claim 1 wherein said recording means includes a multichannel, magnetically responsive signal storage means.

3. A system as claimed in claim 2 wherein said recording means comprises a variable speed, multichannel magnetic tape recorder.

4. A system as claimed in claim 1 wherein said first shift register includes means for producing an output signal indicative of the end of each data word comprising a predetermined number of data bits in each group of said asynchronous digital data.

5. A system as claimed in claim 1 wherein said recording means is controllable to provide a desired amount of time delay in the transfer of said asynchronous digital data to said synchronous data equipment.

References Cited by the Examiner

UNITED STATES PATENTS

| | | | |
|---|---|---|---|
| 3,025,503 | 3/1962 | Perry | 340—174.1 |
| 3,123,810 | 3/1964 | Strauch | 340—174.1 |

ROBERT C. BAILEY, *Primary Examiner.*

R. B. ZACHE, *Assistant Examiner.*